(12) United States Patent
Hu et al.

(10) Patent No.: US 7,349,711 B2
(45) Date of Patent: Mar. 25, 2008

(54) METHOD OF COUNTING THE NUMBER OF MULTIMEDIA BROADCASTING MULTICAST SERVICE SUBSCRIBERS

(75) Inventors: Hao Hu, Guangdong Province (CN); Wenlin Zhang, Guangdong Province (CN); Hai Zhang, Guangdong (CN); Bingyu Qu, Guangdong Province (CN)

(73) Assignee: Huawei Technologies Co., Ltd., Shenzhen, Guangdon Province (CN)

( * ) Notice: Subject to any disclaimer, the term of this patent is extended or adjusted under 35 U.S.C. 154(b) by 0 days.

(21) Appl. No.: 11/248,168

(22) Filed: Oct. 13, 2005

(65) Prior Publication Data

US 2006/0094408 A1    May 4, 2006

Related U.S. Application Data

(63) Continuation-in-part of application No. PCT/CN05/00491, filed on Apr. 13, 2005.

(30) Foreign Application Priority Data

Apr. 15, 2004    (CN)    .................. 2004 1 0030555

(51) Int. Cl.
    *H04B 7/00*    (2006.01)
(52) U.S. Cl. .................. 455/519; 455/518; 455/414.1; 455/417; 455/453; 370/312; 370/349; 370/390; 370/432
(58) Field of Classification Search ............. 455/414.1, 455/550.1, 551, 552.1, 553.1, 412.2, 515, 455/518, 519, 453, 417, 503; 370/312, 349, 370/390, 432
See application file for complete search history.

(56) References Cited

U.S. PATENT DOCUMENTS 6,385,461 B1 *    5/2002    Raith ..................... 455/518

(Continued)

FOREIGN PATENT DOCUMENTS

CN    1438807 A    8/2003

(Continued)

OTHER PUBLICATIONS

3GPP TS 25.346 vV7.2.0 (Sep. 2006) Technical Specification, 3rd Generation Partnership Project; Technical Specification Group Radio Access Network; Introduaction of the Multimedia Broadcast Multicast Service (MBMS) in the Radio Access Network (RAN); Stage 2 (release 7), pp. 9, 17 and 28-37.*

(Continued)

*Primary Examiner*—Rafael Perez-Gutierrez
*Assistant Examiner*—Olumide Ajibade-Akonai
(74) *Attorney, Agent, or Firm*—Townsend and Townsend and Crew LLP (57) ABSTRACT

The present invention discloses a method of counting the number of MBMS subscribers, comprising: setting different types of notifications, each of which is designed to instruct UEs in at least one mode to respond said counting number of subscribers; the network side issuing different types of notifications, so as to monitor the activation of UEs in at least one mode in the MBMS with said notifications, and thereby achieving counting the number of subscribers of each MBMS. The method of counting the number of MBMS subscribers provided in the present invention can be used to perform counting the number of subscribers of each MBMS more accurately, so as to take fuller advantage of the precious air interface resource.

11 Claims, 5 Drawing Sheets

U.S. PATENT DOCUMENTS

| | | | |
|---|---|---|---|
| 6,490,452 B1* | 12/2002 | Boscovic et al. | 455/436 |
| 6,882,850 B2* | 4/2005 | McConnell et al. | 455/453 |
| 7,239,880 B2* | 7/2007 | Shaheen | 455/458 |
| 2002/0077087 A1* | 6/2002 | Li | 455/414 |
| 2004/0045029 A1 | 3/2004 | Matsura | |
| 2004/0131026 A1* | 7/2004 | Kim et al. | 370/328 |
| 2004/0152453 A1* | 8/2004 | Hayashi | 455/412.2 |
| 2004/0157640 A1* | 8/2004 | Pirskanen et al. | 455/552.1 |
| 2004/0223513 A1* | 11/2004 | Meago | 370/468 |
| 2005/0118992 A1 | 6/2005 | Jeong et al. | |
| 2005/0232292 A1 | 10/2005 | Richards et al. | |
| 2006/0154627 A1* | 7/2006 | Wang et al. | 455/130 |

FOREIGN PATENT DOCUMENTS

| | | |
|---|---|---|
| WO | WO03/019828 A2 | 3/2003 |
| WO | WO2004/102901 | 11/2004 |
| WO | WO2005/006596 | 1/2005 |

OTHER PUBLICATIONS

Annamalai, "Multimedia Broadcast Multicast Service (MBMS) in GSM based Wireless Networks"; T-Mobile USA; Apr. 2004, 24 pages total.

3rd Generation Partnership Project, "Universal Mobile Telecommunications System (UMTS); Introduction of Multimedia Broadcase/Multicast Service (MBMS) in the Radio Access Network (RAN) Stage 2" (3GPP) TS 25.346 version 6.0.0 Release 6) Etsi Standards, European Telecomminications Standards Institute, Sophia-Antipo, FR, No. V600, Mar. 31, 2004, 52 pages, XP002367431 ISSN: 0000-0001.

Huawei Technologies Co., Ltd., "MBMS service counting procedure for URA_PCH," 3GPP TSG-RAN Working Group 2 MBMS Ad Hoc Meeting, Budapest, Hungary, Apr. 20-22, 2004, [Online], Apr. 20, 2004, XP002431072, retrieved from the Internet: <<http//3gpp.org/ftp/tsg_ran/WGRL2/TSGR2_AHs/2004_04_MBMS/R2-040790.zip>>, 5 pages total.

"3rd Generation Partnership Project; Technical Specification Group Radio Access Network; Introduction of the Multimedia Broadcast Multicast Service (MBMS) in the Radio Access Network (RAN); Stage 2 (Release 6)," *3GPP TS 25.346*, Mar. 2004, V6.0.0., 3rd Generation Partnership Project (3GPP), Valbonne, France.

* cited by examiner

METHOD OF COUNTING THE NUMBER OF MULTIMEDIA BROADCASTING MULTICAST SERVICE SUBSCRIBERS

CROSS-REFERENCE TO RELATED APPLICATION

This application is a continuation-in-part of International Application No. PCT/CN2005/000491 filed Apr. 13, 2005, designating the United States and claiming priority from Chinese Patent Application No. 200410030555.7 filed Apr. 15, 2004. The subject matter of both foregoing applications is incorporated herein by reference.

FIELD OF THE INVENTION

The present invention relates to a new value-added service technology in mobile communication network system, particularly to a method of counting the number of the new value-added service subscribers.

BACKGROUND OF THE INVENTION

Multimedia Broadcasting Multicast Service (MBMS) is a technology designed to transmit data messages from a data source to multiple destination terminals in existing mobile packet communication network systems.

Presently, in legacy mobile communication network systems, Cell Broadcast Service (CBS) enables transmitting low bit rate data to all user terminals through shared broadcast channels in cells, and it belongs to a message service. Now, people's demand for mobile communication is no longer limited to telephone and message services. As Internet develops rapidly, a great deal of multimedia services come to the fore, and some application services require that multiple user terminals can receive identical data simultaneously, such as VOD, telecast, videoconference, online education, and interactive games, etc. Compared with general message services, those mobile multimedia data services are featured with high data volume, long duration, and high sensitivity to time delay, etc.

In order to utilize the resources in mobile communication networks more efficiently, 3GPP, the WCDMA/GSM Global Standardization Organization, has put forward MBMS. MBMS provides the PTM technology of transmitting data from a data source to multiple user terminals in mobile communication network systems and thereby implements sharing of network resources and improves utilization ratio of network resources, especially utilization ratio of air interface resource. MBMS supports not only broadcasting and multicasting of low data rate plain text messages but also broadcasting and multicasting of high data rate multimedia data services, which undoubtedly accommodates the developing trend to mobile data communication technology in the future.

When MBMS is based on a WCDMA/GSM mobile packet communication network, air interface resource can be shared through adding some new functional entities (e.g., Broadcasting Multicast—Service Center (BM-SC)) in the existing communications network system, adding MBMS capability in existing functional entities in PS-service domain, such as Service GPRS Supporting Nodes (SGSNs), Gateway GPRS Supporting Nodes (GGSNs), Radio Network Controllers (RNCs), and User Equipments (UEs), and defining new logically shared channels.

Figure 1:
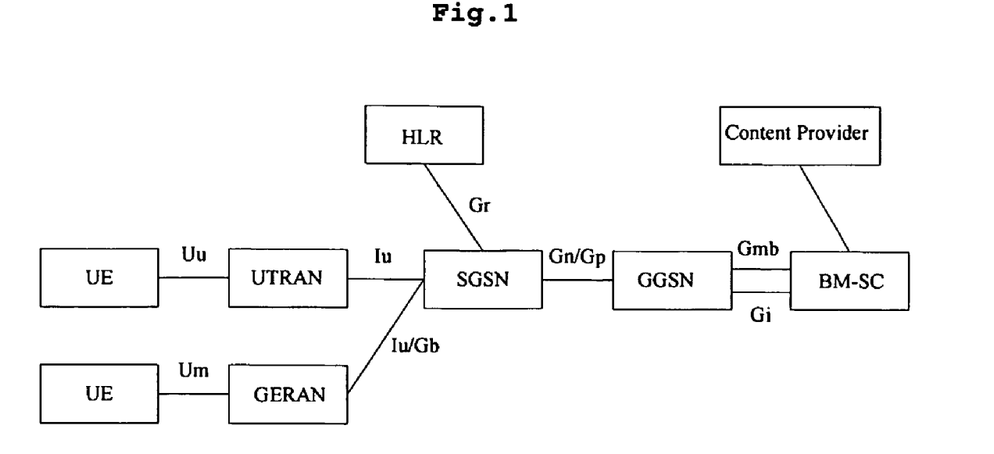
FIG. 1 shows a reference model of MBMS network implemented over GPRS packet mobile network in the prior art.

FIG. 1 shows a reference model of MBMS network implemented over GPRS packet mobile network in the prior art; wherein the BM-SC is a newly added MBMS functional entity mainly designed as an entry for the Content Provider and used to authorize and initiate MBMS bearer service in the mobile network, and transmit MBMS content to multiple UEs as scheduled. The edges of MBMS bearer service are Gmb and Gi reference points shown in the figure (i.e., the interface part between BM-SC and GGSN); wherein, Gmb interface is designed to provide functions on the control plane, while Gi interface is designed to provide bearer functions on the subscriber plane. In the network topology with MBMS capability shown in the figure, the only newly added interface is Gmb interface; other interfaces are existing ones in a WCDMA/GSM network system.

In the prior art, MBMS utilizes high speed radio transmission to send identical data created from the same data source to multiple mobile UEs; wherein, the sent data mainly comprises multimedia data required by Streaming service or Background QoS.

Wherein, each MBMS shall employ an appropriate bearer mode in each cell according to the number of subscribers of the MBMS: Point-to-Point (PTP) or Point-to-Multipoint (PTM) mode. Wherein, PTP bearer mode refers that the MBMS is borne on a dedicated channel of the subscriber who receives the MBMS, while PTM bearer mode refers that the MBMS is borne on a public channel in the mobile communication system.

In the prior art, the number of subscribers of a MBMS in a cell is counted through the Counting process. At present, in a mobile packet communication network system (e.g., GPRS network, 3G network, etc.), the Radio Network Controller (RNC) can wake up UEs in Idle mode and perform counting such UEs in certain conditions.

Wherein, in the RNC in a network system, a corresponding MBMS Service Context is configured for each MBMS. Each MBMS Service Context contains the records of UEs that are added to the MBMS and in RRC Connected or PMM-Connected Mode. Through performing counting the number of UEs recorded in each MBMS Service Context, RNC can obtain the number of subscribers who receive a MBMS in a cell and choose the corresponding bearer mode according to the number of subscribers of each MBMS in each cell, so as to transmit corresponding MBMS service data to multiple UEs.

At present, in the TS25.346 Protocol issued by 3GPP, counting the number of subscribers of each MBMS in each cell is stipulated as follows:

If the Radio Resource Management (RRM) in the network system requires counting the number of subscribers of each MBMS in each cell, the following steps have to be executed:

1) A MBMS session is initiated;
2) RNC converts subscribers in URA_PCH (UTRAN Registration Area Public Channel) state to as in CELL_PCH (CELL Public Channel) state through paging (wherein, URA_PCH and CELL_PCH are two working states of UEs under control of RNC in a 3G network system);
3) RNC pages UEs in Idle mode with Terminal Mobile Group Identify (TMGI), so that the UEs establish Radio Resource Connected (RRC) connections to RNC; then, RNC obtains the information of each existing subscriber receiving the MBMS service data in each cell through the Core Network (CN), and records the subscriber information in the MBMS Service Context corresponding to the MBMS;
4) RNC performs counting the number of subscribers recorded in the MBMS Service Context corresponding to the MBMS; if RNC finds the number of subscribers receiving the MBMS service data exceeds a predefined threshold (the threshold for switching between PTP and PTM mode), RNC will transmit the MBMS service data to multiple UEs in PTM mode in the cell, i.e., it will transmit the MBMS service data to multiple UEs through public channel broadcasting;

if RNC finds the number of subscribers is less than the predefined threshold, RNC will transmit the MBMS service data to UEs requiring the MBMS service data in PTP mode in the cell, i.e., it establishes a dedicated channel to each subscriber and transmits the MBMS service data to the subscriber;

5) in the above transmission process of MBMS service data, RNC can also perform Recounting operation.

However, the method of performing counting the number of subscribers of each MBMS in each cell with above technology has the following drawbacks:

(A) In step 3), subscribers in CELL-PCH state and subscribers in URA-PCH state may not be distinguished clearly from each other in the counting processes in different cases; therefore, the counting may be incomplete and thus may cause an inaccurate result during RNC performing counting the number of subscribers of a MBMS, and thereby RNC may send MBMS service data to UEs which need not receive the MBMS service data, resulting in waste of air interface resource.

(B) In the above process of counting the number of subscribers of a MBMS, for each subscriber who has subscribed a MBMS and is in CELL_DCH state or CELL_FACH state, RNC deems the UE will receive the MBMS service data by default. Actually, the UE may not intend to receive the MBMS service data. However, RNC will count such UEs in the Counting, resulting in error in the counting result and in waste of air interface resource as well.

SUMMARY OF THE INVENTION

The present invention provides a method of counting the number of subscribers of Multimedia Broadcasting Multicast Service (MBMS), so that the number of subscribers of each MBMS can be counted more accurately even when the UEs are in different modes, and thereby the precious air interface resource can be take full advantage of.

To solve the above problem, the present invention provides a method of counting the number of subscribers of MBMS, comprising the following steps:

setting different types of notifications, each of which is designed to instruct the UEs in at least one mode to respond to the counting of the number of subscribers;

the network side issuing notifications to UEs, so as to monitor the activation of UEs in at least one mode to a MBMS with said notifications respectively and implement counting the number of subscribers of each MBMS.

Wherein, the RNC at the network side sets the notifications in the MBMS control channel and issue the notifications to UEs.

Wherein, the method further comprises the following step before the RNC at the network side issues notifications to UEs: the Core Network transmitting the MBMS session start message to said network side.

Said method also comprises the following steps:

Setting the Threshold for switching between PTP mode and PTM mode;

The network side comparing the counting result of the number of MBMS subscribers with said switching threshold, and choosing the appropriate bearer mode according to the comparison result to transmit MBMS service data to UEs.

When the counting result of the number of MBMS subscribers is greater than or equal to the said switching threshold, the network side will choose PTM mode to transmit the MBMS service data to UEs; otherwise the network side will chose PTP mode to transmit the MBMS service data to UEs.

Wherein, said notification is designed to instruct the UEs in Connected mode and UEs in Idle mode to respond to counting the number of subscriber; or it is designed to instruct the UEs in Idle mode to respond to counting the number of subscribers; or it is designed to instruct the UEs in Discontinuous Reception mode to respond to counting the number of subscribers; or it is designed to instruct the UEs in Idle mode and UEs in Discontinuous Reception mode to respond to counting the number of subscribers.

Different types of notifications are represented respectively in different binary numbers.

Wherein, said process of counting the number of subscribers of each MBMS further comprises:

the network side issuing a notification to the UEs to instruct UEs in Connected mode and UEs in Idle mode to respond to counting the number of subscribers; and through monitoring the activation of UEs in Connected mode and UEs in Idle mode to the MBMS, the network side implementing counting the number of subscribers of each MBMS.

Wherein, said method also comprises the following steps after said process of counting the number of subscribers of each MBMS is completed:

the Core Network transmitting the MBMS session information to the network side;

the network side performing recounting the number of subscribers of each MBMS through reissuing different types of notifications to UEs according to the predefined decision condition.

Wherein, said step that the network side performs recounting the number of subscribers of each MBMS through issuing different types of notifications to UEs according to the predefined decision condition further comprises:

setting the Threshold for switching between PTP mode and PMP mode;

suppose the number of UEs that receive the MBMS service data and are positioned by the RNC in each cell is n (a natural number);

when the network side finds the number of UEs accessing the MBMS in URA_PCH state is less than or equal to value (Threshold-Max(n)), the network side performing recounting the number of subscribers of each MBMS through reissuing a notification to the UEs to instruct UEs in Idle mode to respond to counting the number of subscribers;

Wherein, subscribers in URA-PCH and/or CELL-PCH and/or CELL_FACH state use cell update process to respond to the counting instruction sent from the network; while subscribers in CELL-FACH and/or CELL-DCH state use dedicated channel transmission to respond to the counting instruction from the network.

Said UEs in URA_PCH state being UEs in Discontinuous Reception mode.

Said process that the said network side performs recounting the number of subscribers through reissuing different types of notifications to UEs according to the decision condition further comprises:

setting the Threshold for switching between PTP mode and PTM mode;

suppose the number of UEs that receive the MBMS service data and are positioned by the RNC in each cell is n (a natural number);

when the network side finds the number of UEs accessing the MBMS in URA_PCH state is less than or equal to value (Threshold-Max(n)), it performing recounting the number of subscribers of each MBMS through reissuing the notification to the UEs to instruct UEs in Idle mode and UEs in Discontinuous Reception mode to respond to counting the number of subscribers;

said UEs in URA_PCH state being UEs in Discontinuous Reception mode.

wherein, said process that the said network side performs recounting the number of subscribers through reissuing different types of notifications to UEs according to the decision condition further comprises:

setting the Threshold for switching between PTP mode and PMP mode;

suppose the number of UEs that receive the MBMS data and are positioned by the RNC in each cell is n (a natural number);

when the network side finds the number of UEs accessing the MBMS in URA_PCH state exceeds value (Threshold-Max(n)), the network side performing recounting the number of subscribers of each MBMS through reissuing the notification to the UEs to instruct UEs in Discontinuous Reception mode to respond to counting the number of subscribers;

said UEs in URA_PCH state being UEs in Discontinuous Reception mode.

Wherein, the UEs in Idle mode respond at the probability specified by the RNC to the notification that instructs the UEs in Idle mode to respond to counting the number of subscribers; while the UEs in Discontinuous Reception mode respond at the probability specified by the RNC or entirely to the notification that instructs the UEs in Discontinuous Reception mode to respond to counting the number of subscribers.

Through setting different types of notifications, the method of counting the number of MBMS subscribers provided in the present invention can support the network side to use different type of notifications to instruct UEs in at least one mode to participate in the Counting the number of MBMS subscribers, so as to expand the MBMS subscriber counting scope and improve counting accuracy, and thereby choose different radio bearer modes to send MBMS service data according to the accurate counting result of the number of subscribers. Therefore, it is helpful to avoid unnecessary radio resource occupation and take full advantage of precious air interface resource.

DETAILED DESCRIPTION OF THE EMBODIMENTS

In view of the defect of inaccuracy in counting the number of MBMS subscribers in the prior art, the method of counting the number of MBMS subscribers provided in the present invention provides an optimized counting method. It employs a flexible Notification mechanism to ensure the UEs in different modes can be taken into account in the number of MBMS subscribers when they receive the MBMS service data.

Hereunder the implementation procedures of the method of counting the number of MBMS subscribers provided in the present invention is described in detail in the embodiments, with reference to the attached drawings; wherein, the abbreviations of the terms used in this document are as follows:

User Equipment—UE
multimedia Broadcasting Multicast Service—MBMS
Radio Network Controller—RNC
Point-to-Point—PTP
Point-to-Multi-Points—PTM
Core Network—CN For the purpose of description, hereunder the present invention is described with the abbreviations of the terms.

Figure 2:
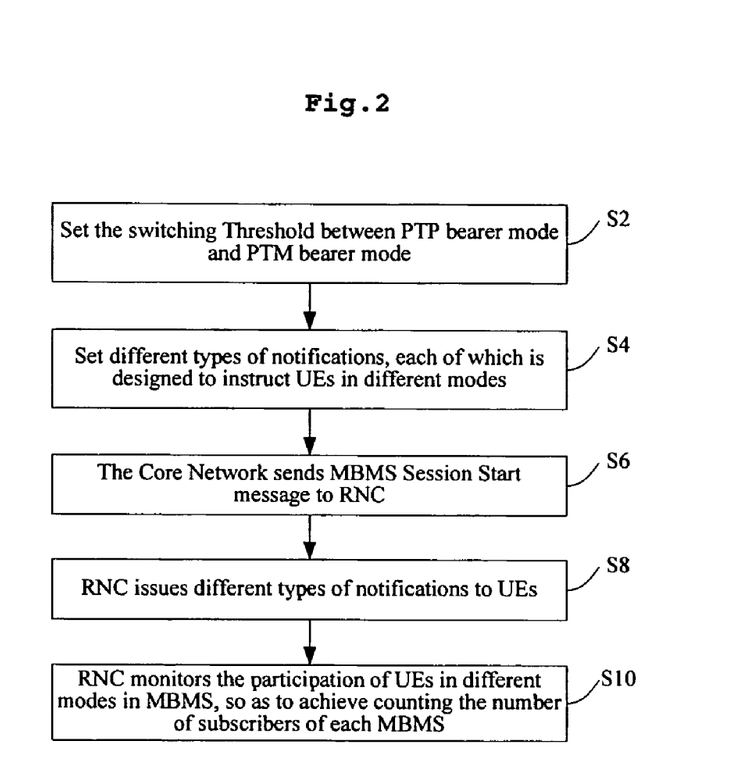
FIG. 2 shows the major implementation procedures of the method of counting the number of MBMS subscribers provided in the present invention.

FIG. 2 shows the major implementation procedures of the method of counting the number of MBMS subscribers provided in the present invention; as shown in the figure, the steps for counting the number of subscribers of each MBMS are as follows:

step S2: the network side setting a Threshold for switching between PTP mode and PTM mode;

step S4: setting different types of notifications, each of which is designed to instruct the UEs in at least one mode to respond to counting the number of subscribers;

In a 3G mobile communication network, the mode of Radio Resource Control (RRC) is designed to describe and distinguish radio transmission channel resource usage by some UEs in specific modes, i.e., the mode information of UEs. Depending on whether the UEs have established RRC Connections, the UE modes are classified into two types: UE Idle Mode and UTRA RRC Connected Mode. In particular the working modes of UEs are as follows:

1. UE Idle Mode

RNC will not use any other data transmission channel except for the data transmission channels for Paging and Broadcast, that is to say, RNC will not occupy other radio channel resources in the system. At the same time, UEs have no RRC Signaling Connection.

In this mode, UEs can choose between Cell and Public Land Mobile Network (PLMN) to decide which Service Provider will be employed, receive information transmitted from the Service Provider's base stations, and make some necessary configuration actions and pre-configuration of radio channel resource, so as to utilize the Cell and radio resources provided from the Service Provider.

2. UTRA RRC Connected Mode

The root nature of the mode is the establishment of the RRC Signaling Connections designed to transmit RRC Messages between UEs and UTRAN-RNC. In this mode, UEs will use radio channel resource of the system. This mode can be subdivided into 4 states, depending on the usage of the radio channel resource:

(A) Cell_FACH: in this state, UEs can also use radio resources provided by the Service Provider through UTRAN-DRNC setting to all UEs in the broadcasting scope of the Cell for sharing, besides the radio channel resource for Paging and Broadcast.

(B) Cell_DCH: in this state, UEs can use dedicated radio channel resource determined by UTRAN-SRNC setting.

(C) Cell_PCH: in this state, UEs can use radio resources provided by the Service Provider through UTRAN-DRNC setting to all UEs in the broadcasting scope of the Cell for sharing, besides the radio channel resource for Paging and Broadcast. Most different from Cell_FACH state, UEs will not send any information in this state; instead, they only take receiving actions. UEs in Cell_PCH state can notify the system about their locations in the Cells.

(D) URA_PCH: in this state, UEs can use radio resources provided by the Service Provider through UTRAN-DRNC setting to all UEs in the broadcasting scope in the Cell for sharing, besides the radio channel resource for Paging and Broadcast. Similar to being in the Cell_PCH state, UEs in this state will not send any information; instead, they only take receiving actions. However, different from being in the Cell_PCH state, the system can only know the UTRAN Registration Areas of the UEs instead of the exact Cells of the UEs.

Therefore, in conclusion, the maximum difference between CELL_PCH/URA_PCH state and UE Idle Mode is whether the RRC Connections are established; whereas, the difference between URA_PCH state and CELL_PCH state is whether the system knows the Cell locations of UEs in the scope smaller than URA.

In the method of counting number of MBMS subscribers provided in the present invention, the UEs in Connected mode refer to the UEs in Cell_FACH, Cell_DCH, Cell_PCH, or URA_PCH state;

the UEs in Idle mode refer to the UEs in UE Idle Mode;

the UEs in Non-connected mode refer to the UEs in Cell_PCH or URA_PCH state;

Hereunder, we describe the implement procedures of the method of counting the number of MBMS subscribers provided in the present invention, with Cell_FACH, Cell_DCH, Cell_PCH, and URA_PCH states as Connected mode, Idle Mode as Idle mode, and Cell_PCH and URA_PCH states as Discontinuous Reception mode.

Wherein, the notifications set in step S2:

can be used to instruct UEs in Connected mode (Cell_FACH, Cell_DCH, Cell_PCH, or URA_PCH) and UEs in Idle mode (UE Idle mode) to respond to counting the number of subscribers;

can be used to instruct UEs in Idle mode (UE Idle mode) to respond to counting the number of subscribers;

can be used to instruct UEs in Discontinuous Reception mode (Cell_PCH or URA_PCH) to respond to counting the number of subscribers;

can also be used to instruct UEs in Idle mode (UE Idle mode) and UEs in Discontinuous Reception mode (Cell_PCH or URA_PCH) to respond to counting the number of subscribers;

in addition, the network side can also set a notification different from above notifications, in order to instruct UEs not to respond to counting the number of MBMS subscribers.

Wherein, the notifications designed to instruct UEs in different modes to respond to counting the number of subscribers can be represented in different binary numbers.

The notification described in step S4 can be set by RNC in MBMS Indicator Channel (MICH) or MBMS control channel.

Step S6: CN sending a Session Start message for a MBMS to the RNC at the network side;

step S8: when the RNC at the network sides receives the Session Start message for the MBMS, it issuing the notification set in MICH to the UEs; the UEs in corresponding modes responding to the notification and notifying CN when they participate in the MBMS; wherein, the task of issuing different types of notifications from the network side to the UEs can be accomplished by RNC or another functional entity (e.g., a base station or a delivery unit dedicatedly designed to issue the notifications) in the network; of course, in a standard-compliant 3G network system, it is preferable to use RNC to issue the notifications to the UEs. Hereunder the implement procedures of the method of counting the number of MBMS subscribers provided in the present invention are detailed on the presumption that the notifications to the UEs are issued by RNC;

step S10: RNC obtaining the information of UEs' activation in the MBMS through detecting activation of the UEs instructed by different notifications and through connecting to CN; then, RNC performing statistics on the MBMS Service Context corresponding to the MBMS, so as to attain the object of counting the number of MBMS subscribers.

Figure 3:
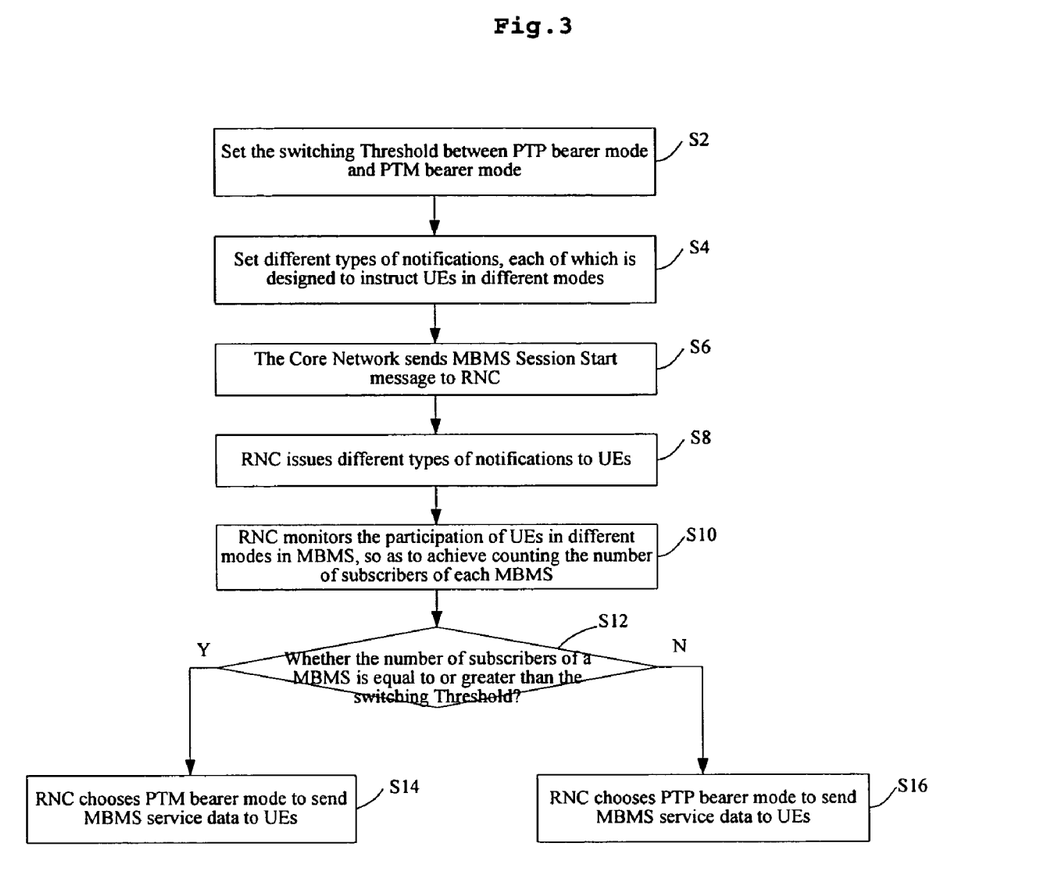
FIG. 3 shows the processing flow of choosing different bearer modes implemented on the basis of the method of counting the number of MBMS subscribers provided in the present invention.

On the basis of accurate counting the number of MBMS subscribers as described above, the bearer mode for transmitting the MBMS service data to UEs can be determined according to the counting result. FIG. 3 shows the processing flow of choosing different bearer modes implemented on the basis of the method of counting the number of MBMS subscribers provided in the present invention; the processing flow further comprises the following steps on the basis of counting the number of MBMS subscribers described in step S10 in FIG. 2:

step S12: RNC judging whether the number of subscribers of a MBMS in a Cell is greater than or equal to the Threshold for switching; if it is, RNC executing step S14; otherwise RNC executing step S16;

step S14: RNC choosing PTM mode for the UEs receiving the MBMS service data in the Cell, to transmit the MBMS service data to all UEs that have participated in the MBMS;

step S16: RNC choosing PTP mode for the UEs receiving the MBMS service data in the Cell, to transmit the MBMS service data to all UEs that have participated in the MBMS.

Figure 4:
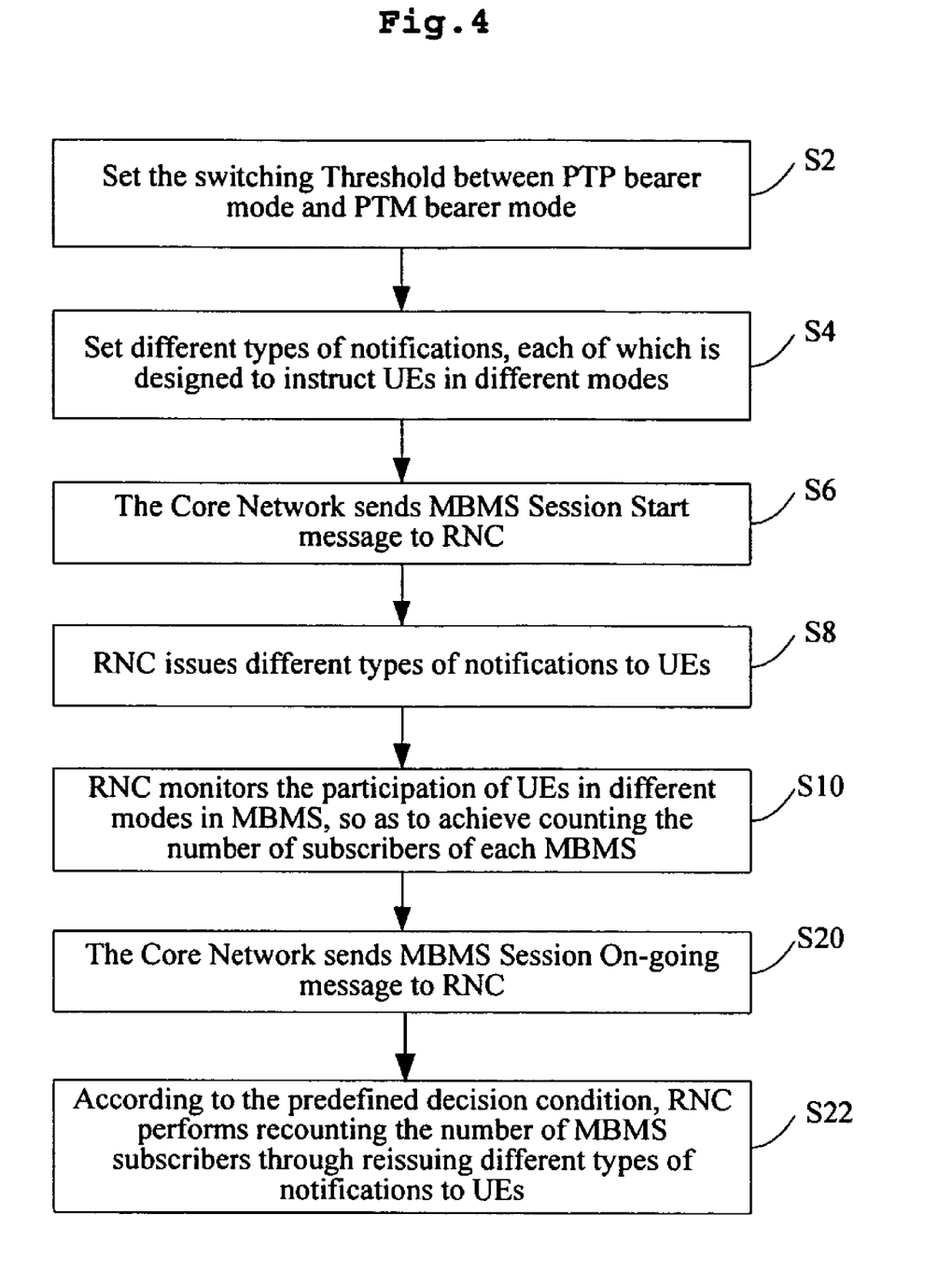
FIG. 4 shows the flow of recounting implemented on the basis of the method of counting the number of MBMS subscribers provided in the present invention.

In addition, on the basis of accurately counting the number of subscribers of each MBMS as described above, Recounting can be performed for the number of subscribers of each MBMS during a MBMS Session. FIG. 4 is a flow diagram of recounting the number of subscribers of each MBMS implemented on the basis of the method in the present invention; the method provided in the present invention can also comprise the following steps on the basis of counting the number of subscribers of each MBMS described in step S10 in FIG. 2:

step S20: CN sending the Session information of a MBMS to RNC;

step S22: RNC performing recounting the number of MBMS subscribers through reissuing notifications to UEs according to the predefined decision condition.

Figure 5:
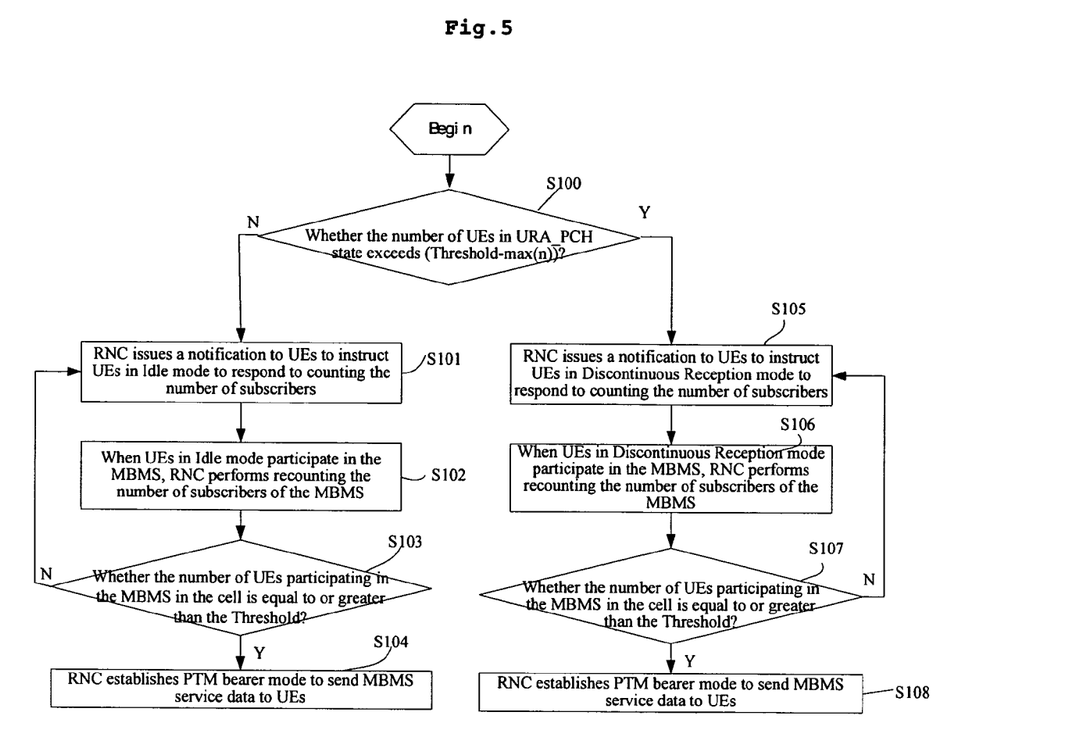
FIG. 5 is a flow diagram of the first embodiment of recounting in the method of counting the number of MBMS subscribers provided in the present invention.

Wherein, the process of recounting the number of MBMS subscribers can be divided into two cases (hereunder, the process is described with the following example: RNC issue notifications that instruct UEs in Connected mode and UEs in Idle mode to respond to counting the number of subscribers to UEs; RNC performs counting the number of MBMS subscribers through monitoring the activation of UEs in Connected mode and UEs in Idle mode into the MBMS, and on that basis, RNC performs recounting). The first case is shown in FIG. 5, a flow diagram of the first embodiment of recounting in the method of counting the number of MBMS subscribers provided in the present invention. First, the network side sets a decision condition as follows:

setting the switching threshold value for switching between PTP mode and PMP mode as Threshold;

in the cells controlled by RNC, suppose the number of UEs participating in the MBMS (here, the UEs refer to UEs with cell location information detected by RNC, such as UEs in CELL_PCH state, UEs in CELL_DCH state, and UEs in CELL_FACH state) in each cell is n (a natural number); for example, RNC simultaneously controls the first Cell A, the second Cell B, and the third Cell C, wherein the number of UEs participating in the MBMS (UEs in CELL_PCH state, UEs in CELL_DCH state, and UEs in CELL_FACH state) in the first Cell A is 3, the number of UEs participating in the MBMS (UEs in CELL_PCH state, UEs in CELL_DCH state, and UEs in CELL_FACH state) in the second Cell B is 4, the number of UEs participating in the MBMS (UEs in CELL_PCH state, UEs in CELL_DCH state, and UEs in CELL_FACH state) in the third Cell C is 5, then the Max (n) is equal to the maximum number of UEs participating in the MBMS in the three cells (i.e., 5) (the meaning of Max(n) hereunder is the same);

on the basis of above setting and presumption, the value Threshold-Max(n) is taken as a decision condition.

In detail, RNC performs recounting through the following steps:

step S100: RNC judging whether the number of UEs participating in a MBMS in URA_PCH state exceeds value (Threshold-Max (n)). If not, RNC executing step S101; otherwise RNC executing step S105;

step S101: RNC reissuing the notification to UEs to instruct the UEs in Idle mode to respond to counting the number of subscribers;

step S102: When the UEs in Idle mode participate in the MBMS, RNC recounting the number of subscribers of the MBMS;

step S103: RNC judging whether the number of subscribers of a MBMS in a Cell is greater than or equal to the Threshold; if it is, RNC executing step S104; otherwise RNC executing step S101;

step S104: RNC choosing PTM mode to transmit the MBMS service data to the UEs;

step S105: RNC reissuing the notification to UEs to instruct UEs in URA_PCH state and UEs in CELL_PCH state to respond to counting the number of subscribers;

step S106: When UEs in URA_PCH state and UEs in CELL_PCH state participate in the MBMS, RNC performing recounting the number of MBMS subscribers;

step S107: RNC judging whether the number of UEs of the MBMS in the cell is greater than or equal to the Threshold; if it is, RNC executing step S108; otherwise RNC executing step S105;

step S108: RNC choosing PTM mode to transmit the MBMS service data to the UEs.

Figure 6:
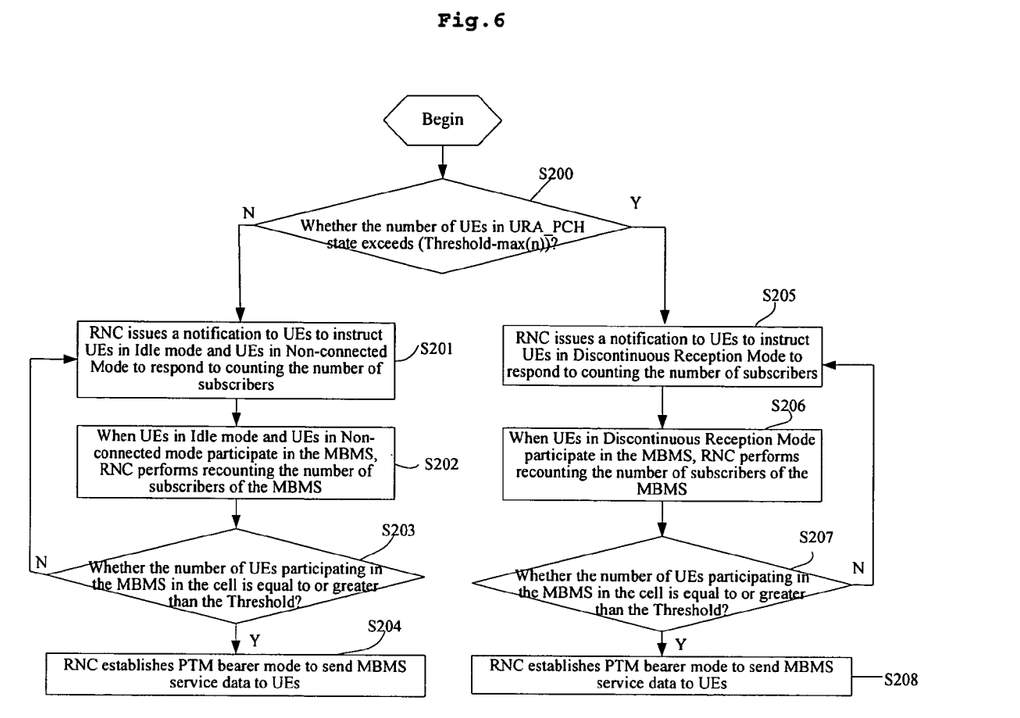
FIG. 6 is a flow diagram of the second embodiment of recounting in the method of counting the number of MBMS subscribers provided in the present invention.

FIG. 6 is the flow diagram of the second embodiment of recounting in the method of counting the number of MBMS subscribers provided in the present invention; the processing flow is similar to that of the first embodiment, as follows:

step S200: RNC judging whether the number of UEs participating in a MBMS in URA_PCH state in a cell exceeds value (Threshold-Max (n)). If not, RNC executing step S201; otherwise RNC executing step S205;

step S201: RNC reissuing the notification to UEs to instruct UEs in Idle mode, UEs in URA_PCH state, and UEs in CELL_PCH state to respond to counting the number of subscribers;

step S202: When UEs in Idle mode, UEs in URA_PCH state, and UEs in CELL_PCH state participate in the MBMS, RNC performing recounting the number of MBMS subscribers;

step S203: RNC judging whether the number of UEs participating in the MBMS in the cell is greater than or equal to the Threshold; if it is, RNC executing step S204; otherwise RNC executing step S201;

step S204: RNC choosing PTM mode to transmit the MBMS service data to the UEs;

step S205: RNC reissuing the notification to UEs to instruct UEs in URA_PCH state and UEs in CELL_PCH state to respond to counting the number of subscribers;

step S206: When UEs in URA_PCH state and UEs in CELL_PCH state participate in the MBMS, RNC performing recounting the number of MBMS subscribers;

step S207: RNC judging whether the number of UEs participating in the MBMS in the cell is greater than or equal to the Threshold; if it is, RNC executing step S208; otherwise RNC executing step S205;

step S208: RNC choosing PTM mode to transmit the MBMS service data to the UEs.

Hereunder an example of above process is described:

The preset parameters are as follows:

Max(n): the maximum number of UEs receiving MBMS service data in CELL_DCH state, CELL_FACH state, or CELL_PCH state in a cell;

Threshold: threshold for switching between PTM/PTP mode in a cell.

The solution of the method of counting the number of MBMS subscribers in the present invention is implemented as follows:

1. CN sends a Session Start message for a MBMS to RNC;

2. RNC need to sets Notification Information (NI) in MCCH, and, if the number of subscribers of the MBMS is to be counted, RNC sets the cause for Counting as follows:

RNC need to set the cause for Counting in the Notification (e.g., the cause can be represented with two binary bits "0" and "1"):

Notification represented with "00" indicates UEs in all modes should respond to Counting; wherein the all modes include: Idle, CELL_DCH, CELL_FACH, URA_PCH, and CELL_PCH;

Notification represented with "01" indicates only UEs in Idle mode should respond to Counting;

Notification represented with "10" indicates UEs in URA_PCH state and UEs in CELL_PCH state should respond to Counting;

Notification represented with "11" indicates UEs in Idle mode, UEs in URA_PCH state, and UEs in CELL_PCH state should respond to Counting.

3. For the Counting number of subscribers in the initial stage, "cause" is set to "00", i.e., RNC will issue an notification to the UEs instruct UEs in all modes to respond to Counting, and require UEs in all modes can't neglect this paging; in detail, the UEs in different modes respond to Counting as follows:

31) For UEs in CELL_DCH, UEs in CELL_FACH, and UEs in CELL_PCH state, if they are ready to receive the MBMS, they will not respond to RNC; otherwise they should respond to RNC to notify they will not receive the MBMS at the moment;

32) UEs in URA_PCH and/or CELL-PCH and/or CELL_FACH states will initiate cell update operations at a certain probability;

33) UEs in Idle mode will perform RRC linking operations at a certain probability;

34) RNC obtains the information about activation of UEs in different modes into the MBMS from CN through UE Linking process, and performs counting the UEs of the MBMS in each cell, with consideration of feedback information from UEs in CELL_DCH, UEs in CELL_FACH, and UEs in CELL_PCH states.

Now, the initial Counting process is completed.

4. The Recounting during the MBMS Session is treated as follows:

41) In the case that the number of UEs participating in the MBMS in URA_PCH state is less than (Threshold-max(n)) (wherein, max(n) represents the maximum number of UEs in CELL_DCH, UEs in CELL_PCH, and UEs in CELL_FACH states and ready to receive the MBMS in a cell), the Recounting process is as follows:

(1) RNC reissue the notification "01" to UEs to instruct the UEs in Idle mode to respond to Counting;

(2) Only the UEs in Idle mode will respond to the Notification "01" and establish RRC connections and Iu connections at a certain probability;

(3) RNC obtains the information of activation of the UEs into the MBMS from CN;

(4) If RNC finds the number of UEs of the MBMS in a cell reaches to the Threshold, it transmit the MBMS service data to the UEs in PTM bearer mode; if the number of UEs of the MBMS doesn't reach to the Threshold, RNC continues to notify the UEs that haven't responded successfully, i.e., RNC repeats step (1);

Now, the Recounting process is completed.

Of course, in above step (1), RNC can also reissue a notification "11" to the UEs to instruct UEs in Idle mode and UEs in URA_PCH state to respond to Counting, so that all UEs in Idle mode and UEs in URA_PCH state will respond at a certain probability.

42) In the case that the number of UEs participating in the MBMS in URA_PCH state exceeds (Threshold-max(n)), the Recounting process is as follows:

(a) RNC reissues the notification "10" to UEs to instruct UEs in URA_PCH state and UEs in CELL_PCH state to respond to Counting;

(b) the UEs in URA_PCH state initiate cell update process at a certain probability when they receive the notification;

(c) RNC responds to the cell update requests and instruct UEs as required;

(d) If RNC finds the number of UEs participating in the MBMS in a cell reaches to the Threshold, RNC will transmit the MBMS data to the UEs in PTM bearer mode; if the number doesn't reach to the Threshold, RNC will continue to notify UEs that haven't respond successfully in the cell, i.e., RNC repeats step (1);

(e) If the UEs in URA_PCH state doesn't reach to the Threshold in the cell, RNC will go on to issue the notification "10" to UEs to instruct the UEs in Idle mode to respond to Counting, and include the UEs in counting.

Now, the Recounting process is completed.

Above UEs in Idle mode respond to the notification that instruct UEs in Idle mode to respond to counting at the probability specified by RNC; UEs in Discontinuous Reception mode (CELL_DCH, CELL_FACH, and CELL_PCH) respond to the notification that instruct UEs in Discontinuous Reception mode to respond to counting at the probability specified by RNC or entirely.

Hereunder the technical details of the method of counting the number of MBMS subscribers provided in the present invention are detailed in different embodiments, so as to disclose the method more completely.

Embodiment 1

The embodiment is a process of initial counting the number of subscribers of a MBMS;

1. RNC obtains a Session Start message for a MBMS from CN;
2. RNC decides to perform Counting the number of MBMS subscribers, and issues a Notification "00" to instruct UEs in all modes to respond to Counting;
3. when UEs in CELL_DCH, CELL_PCH, or CELL_FACH state receives the Notification "00", if they are ready to receive the MBMS, they needn't to feed back information to RNC; otherwise they should respond to RNC to reject receiving the information;
4. when UEs in URA_PCH state receive the Notification "00", they will perform cell update operation at the probability with factor indicated in the Notification; if there is no UE in URA_PCH state, Iu-ps connections will be established;
5. UEs in Idle mode will establish RRC connections and Iu-ps connections at a certain probability;
6. RNC obtains the information of activation of the UEs in the MBMS via CN through UE Linking process;
7. RNC obtains the bearer mode for the MBMS according to the information obtained through UE Linking and the feedbacks from UE in step 3.

Embodiment 2

The embodiment is similar to above embodiment 1; the difference is: all UEs may not respond to the Notification "00".

Embodiment 3

The embodiment is similar to above embodiment 1; the difference is: if RNC finds the total number of UEs in URA_PCH state and UEs in CELL_PCH state that feedback successfully is less than the total number of the UEs in URA_PCH state and UEs in CELL_PCH state and the switching threshold is not exceed yet in some cells, it will use Notification "10" to instruct UEs in URA_PCH state and UEs in CELL_PCH state to respond.

Embodiment 4

The embodiment is similar to embodiment 3; the difference is: RNC use Paging Indicator Channel (PICH) to perform paging to UEs in URA_PCH state and UEs in CELL_PCH state.

Embodiment 5

The embodiment is used for Recounting during carrying on the MBMS Session;

1. When the number of UEs participating in the MBMS in URA_PCH state is far less than (Threshold-max (n)), RNC will issue a Notification "01" to instruct UEs in Idle mode to respond to Counting, i.e., RNC only performs counting UEs in Idle mode;
2. UEs in any other mode will neglect the counting instruction when they receive the Notification "01";
3. UEs in Idle mode will respond to the Notification "01" and establish RRC connections and Iu-ps connections at a certain probability;
4. RNC obtains the information about activation of the UEs in the MBMS via CN through UE Linking, so as to perform Recounting.

Embodiment 6

On the basis of embodiment 5 and embodiment 4, if the number of UEs participating in the MBMS in a cell still doesn't reach to the PTM Threshold, RNC will reissue the Notification "10" to instruct UEs in URA_PCH state and UEs in CELL_PCH state to respond to Counting, so as to perform counting UEs in URA_PCH state and UEs in CELL_PCH state.

Embodiment 7

The embodiment is similar to embodiment 6, but RNC use PICH to perform paging to UEs in URA_PCH state and UEs in CELL_PCH state.

Embodiment 8

On the basis of embodiment 4, the following approach is also applicable:
1. when the number of UEs participating in the MBMS in URA_PCH state is less than (Threshold-max(n)), RNC will reissue the Notification "11" to instruct UEs in Idle mode, UEs in URA_PCH state, and UEs in CELL_PCH state to respond to Counting, i.e., RNC only send the counting notification to UEs in Idle mode, UEs in URA_PCH state, and UEs in CELL_PCH state;
2. UEs in other modes will neglect the counting instruction after they receive the notification;
3. UEs in Idle mode will respond to the Notification and establish RRC connections and Iu-ps connections at a certain probability;
4. UEs in URA_PCH state will perform cell update after they receive the notification;
5. RNC obtains the information about activation of the UEs in the MBMS via CN through UE Linking, so as to perform Recounting.

Embodiment 9

1. when the number of UEs participating in the MBMS in URA_PCH state exceeds (Threshold-max(n));
2. RNC will reissue the Notification "10" to the UEs to instruct UEs in URA_PCH state and UEs in CELL_PCH state to respond to Counting, so as to perform counting UEs in URA_PCH state and UEs in CELL_PCH state;
3. UEs in other modes will neglect the Notification "10";
4. UEs in URA_PCH state will initiate cell update process at a certain probability after they receive the Notification "10";

Embodiment 10

On the basis of embodiment 9, if the number of UEs participating in the MBMS in some cells is still less than the PTM Threshold for switching, RNC will issue a Notification "01" to instruct UEs in Idle mode to respond to Counting, so as to perform Recounting UEs in Idle mode; UEs in Idle mode will establish RRC connections and Iu-ps connections.

Embodiment 11

The embodiment is used for Recounting process of MBMS service;
1. when RNC is required to perform counting the number of MBMS subscribers, it performs counting UEs in URA_PCH state through the PICH channel;
2. If the number of MBMS subscribers in some cells reaches to the Threshold, RNC will not perform paging to UEs in those cells; on the contrary, if the number of MBMS subscribers doesn't reaches to the Threshold, RNC will merely perform paging to UEs in Idle mode with Notification "01".

In the above process, paging messages with MBMS ID are used; when RNC performs paging UEs in URA_PCH state and UEs in CELL_PCH state, RNC can use the traditional Paging mode, or use PICH channel to perform paging to those UEs.

The binary representation of the Notifications used in above technical solution is only an example; wherein, the types of Notifications can be increased or reduced as required; the selection conditions between different types of Notifications may also be various.

The method of counting the number of MBMS subscribers provided in the present invention can be used to perform paging to UEs in different modes in diverse cases, so as to perform counting as required, in order to furthest save precious air interface resource on the premise of accurate counting.

The present invention is described with the preferred embodiments as above. It should be noted that those skilled in the art can make various refinements and embellishments to the embodiments without deviating from the technical principle of the present invention; however, any such refinement or embellishment shall fall in the protected scope of the present invention.

What is claimed is:

1. A method of counting the number of MBMS subscribers, wherein a UE is in one of a plurality of modes, the method comprising the following steps of:
  setting different types of notifications according to the plurality of modes, each of which is designed to instruct UEs in different sets of modes respectively, each of the different sets of modes including at least one of the plurality of modes to respond to counting of the number of subscribers;
  a network side issuing notifications to UEs, so as to monitor an activation of UEs in the different sets of modes to a MBMS with said notifications and implement counting the number of subscribers of the MBMS;
  wherein:
    said notifications are designed to instruct UEs in a Connected mode and UEs in an Idle mode to respond to the counting the number of subscribers; or
    said notifications are designed to instruct the UEs in the Idle mode to respond to the counting the number of subscribers; or
    said notifications are designed to instruct UEs in a Discontinuous Reception mode to respond to the counting the number of subscribers; or
    said notifications are designed to instruct the UEs in the Idle mode and the UEs in the Discontinuous Reception mode to respond to the counting the number of subscribers;
  wherein a process of counting the number of subscribers of each MBMS service further comprises:
    the network side issuing the notifications to the UEs to instruct at least one of the UEs in the Connected mode or the UEs in the Idle mode to respond to the counting the number of subscribers; and
    through monitoring an activation of at least one of the UEs in the Connected mode or the UEs in the Idle mode to an MBMS service, the network side achieving the counting the number of subscribers of each MBMS service;
  wherein said method also comprises the following steps after said process of counting the number of subscribers of each MBMS service is completed:
    a Core Network transmitting MBMS session information to the network side;
    the network side performing recounting the number of subscribers of each MBMS through reissuing different types of notifications to UEs according to a predefined decision condition;
  wherein said process that the network side performing recounting the number of subscribers through reissuing different types of notifications to UEs according to the decision condition further comprises:
    setting a threshold for switching between a PTP bearer mode and a PTM bearer mode;
    supposing the number of UEs which receive MBMS data and whose detail cell location information is known by an RNC in each cell is n (a natural number);
    when the network side finds the number of UEs accessing the MBMS in a URA_PCH state is less than or equal to a value (Threshold-Max(n)), the network side performing recounting the number of subscribers of each MBMS through reissuing notifications to the UEs to instruct the UEs in the Idle mode to respond to the counting of the number of subscribers;
    said UEs in the URA_PCH state being UEs in the Discontinuous Reception mode.

2. A method of counting the number of MBMS subscribers, wherein a UE is in one of a plurality of modes, the method comprising the following steps of:
    setting different types of notifications according to the plurality of modes, each of which is designed to instruct UEs in different sets of modes respectively, each of the different sets of modes including at least one of the plurality of modes to respond to counting of the number of subscribers;
    a network side issuing notifications to UEs, so as to monitor an activation of UEs in the different sets of modes to a MBMS with said notifications and implement counting the number of subscribers of the MBMS;
    wherein the different types of notifications are represented in different binary numbers.

3. The method of counting the number of MBMS subscribers according to claim 2, wherein an RNC at the network side issues the notifications to the UEs.

4. The method of counting the number of MBMS subscribers according to claim 2, wherein said method further comprises the following step before the network side issuing the notifications to UEs, a Core Network transmitting an MBMS session start message to said network side.

5. The method of counting the number of MBMS subscribers according to claim 2, wherein said method further comprises the following steps of:
    setting a threshold for switching between a PTP bearer mode and a PTM bearer mode;
    the network side comparing a result of counting of the number of MBMS subscribers with said threshold for switching, and choosing an appropriate bearer mode according to a result of the comparing and transmitting MBMS service data to UEs.

6. The method of counting the number of MBMS subscribers according to claim 5, wherein if the result of counting of the number of MBMS subscribers is greater than or equal to the threshold for switching by the comparing, the network side choosing the PTM mode to transmit the MBMS service data to the UEs; otherwise the network side choosing the PTP mode to transmit the MBMS service data to the UEs.

7. The method of counting the number of MBMS subscribers according to claim 2, wherein
    said notifications are designed to instruct UEs in a Connected mode and UEs in an Idle mode to respond to the counting the number of subscribers; or
    said notifications are designed to instruct the UEs in the Idle mode to respond to the counting the number of subscribers; or
    said notifications are designed to instruct UEs in a Discontinuous Reception mode to respond to the counting the number of subscribers; or
    said notifications are designed to instruct the UEs in the Idle mode and the UEs in the Discontinuous Reception mode to respond to the counting the number of subscribers.

8. The method of counting the number of MBMS subscribers according to claim 7, wherein
    the UEs in the Idle mode responding to the notifications that instruct the UEs in the Idle mode to respond to the counting the number of subscribers at a probability specified by an RNC;
    the UEs in the Discontinuous Reception mode responding to the notifications that instruct the UEs in the Discontinuous Reception mode to respond to the counting the number of subscribers at the probability specified by the RNC or entirely.

9. The method of counting the number of MBMS subscribers according to claim 7, wherein said method also comprises the following steps after a process of counting the number of subscribers of each MBMS service is completed:
    a Core Network transmitting MBMS session information to the network side;
    the network side performing recounting the number of subscribers of each MBMS through reissuing different types of notifications to UEs according to a predefined decision condition.

10. A method of counting the number of MBMS subscribers, wherein a UE is in one of a plurality of modes, the method comprising the following steps of:
    setting different types of notifications according to the plurality of modes, each of which is designed to instruct UEs in different sets of modes respectively, each of the different sets of modes including at least one of the plurality of modes to respond to counting of the number of subscribers;
    a network side issuing notifications to UEs, so as to monitor an activation of UEs in the different sets of modes to a MBMS with said notifications and implement counting the number of subscribers of the MBMS;
    wherein:
        said notifications are designed to instruct UEs in a Connected mode and UEs in an Idle mode to respond to the counting the number of subscribers; or
        said notifications are designed to instruct the UEs in the Idle mode to respond to the counting the number of subscribers; or
        said notifications are designed to instruct UEs in a Discontinuous Reception mode to respond to the counting the number of subscribers; or
        said notifications are designed to instruct the UEs in the Idle mode and the UEs in the Discontinuous Reception mode to respond to the counting the number of subscribers;
    wherein a process of counting the number of subscribers of each MBMS service further comprises:
        the network side issuing the notifications to the UEs to instruct at least one of the UEs in the Connected mode or the UEs in the Idle mode to respond to the counting the number of subscribers; and
        through monitoring an activation of at least one of the UEs in the Connected mode or the UEs in the Idle mode to an MBMS service, the network side achieving the counting the number of subscribers of each MBMS service;

wherein said method also comprises the following steps after said process of counting the number of subscribers of each MBMS service is completed:
  a Core Network transmitting MBMS session information to the network side;
  the network side performing recounting the number of subscribers of each MBMS through reissuing different types of notifications to UEs according to a predefined decision condition;
wherein said process that the network side performing recounting the number of subscribers through reissuing different types of notifications to UEs according to the decision condition further comprises:
  setting a threshold for switching between a PTP bearer mode and a PTM bearer mode;
  supposing the number of UEs which receive MBMS data and whose detail cell location information is known by an RNC in each cell is n (a natural number);
  when the network side finds the number of UEs accessing the MBMS in a URA_PCH state is less than or equal to a value (Threshold-Max(n)), the network side performing recounting the number of subscribers of each MBMS through reissuing notifications to the UEs to instruct the UEs in the Idle mode and the UEs in the Discontinuous Reception mode to respond to the counting of the number of subscribers;
  said UEs in the URA_PCH state being UEs in the Discontinuous Reception mode.

11. A method of counting the number of MBMS subscribers, wherein a UE is in one of a plurality of modes, the method comprising the following steps of:
  setting different types of notifications according to the plurality of modes, each of which is designed to instruct UEs in different sets of modes respectively, each of the different sets of modes including at least one of the plurality of modes to respond to counting of the number of subscribers;
  a network side issuing notifications to UEs, so as to monitor an activation of UEs in the different sets of modes to a MBMS with said notifications and implement counting the number of subscribers of the MBMS;
wherein:
  said notifications are designed to instruct UEs in a Connected mode and UEs in an Idle mode to respond to the counting the number of subscribers; or
  said notifications are designed to instruct the UEs in the Idle mode to respond to the counting the number of subscribers; or
  said notifications are designed to instruct UEs in a Discontinuous Reception mode to respond to the counting the number of subscribers; or
  said notifications are designed to instruct the UEs in the Idle mode and the UEs in the Discontinuous Reception mode to respond to the counting the number of subscribers;
wherein a process of counting the number of subscribers of each MBMS service further comprises:
  the network side issuing the notifications to the UEs to instruct at least one of the UEs in the Connected mode or the UEs in the Idle mode to respond to the counting the number of subscribers; and
  through monitoring an activation of at least one of the UEs in the Connected mode or the UEs in the Idle mode to an MBMS service, the network side achieving the counting the number of subscribers of each MBMS service;
wherein said method also comprises the following steps after said process of counting the number of subscribers of each MBMS service is completed:
  a Core Network transmitting MBMS session information to the network side;
  the network side performing recounting the number of subscribers of each MBMS through reissuing different types of notifications to UEs according to a predefined decision condition;
wherein said process that the network side performing recounting the number of subscribers through reissuing different types of notifications to UEs according to the decision condition further comprises:
  setting a threshold for switching between a PTP bearer mode and a PTM bearer mode;
  supposing the number of UEs which receive MBMS data and whose detail cell location information is known by an RNC in each cell is n (a natural number);
  when the network side finds the number of UEs accessing the MBMS in a URA_PCH state exceeds a value (Threshold-Max(n)), the network side performing recounting the number of subscribers of each MBMS through reissuing notifications to the UEs to instruct the UEs in the Discontinuous Reception mode to respond to the counting of the number of subscribers;
  said UEs in the URA_PCH state being UEs in the Discontinuous Reception mode.

* * * * *